US008786586B2

(12) United States Patent
Bae et al.

(10) Patent No.: US 8,786,586 B2
(45) Date of Patent: Jul. 22, 2014

(54) SCANNING ORDERS IN INVERSION SCHEMES OF DISPLAYS

(75) Inventors: Hopil Bae, Sunnyvale, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 13/143,186

(22) PCT Filed: May 24, 2011

(86) PCT No.: PCT/US2011/037811
§ 371 (c)(1), (2), (4) Date: Jul. 1, 2011

(87) PCT Pub. No.: WO2012/161704
PCT Pub. Date: Nov. 29, 2012

(65) Prior Publication Data

US 2012/0299900 A1 Nov. 29, 2012

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.
CPC .......... *G09G 3/3614* (2013.01); *G09G 2310/02* (2013.01); *G09G 2320/0209* (2013.01)
USPC .......................................... 345/210; 345/100

(58) Field of Classification Search
USPC ........................... 345/88, 100, 208–214, 691
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |

(Continued)

FOREIGN PATENT DOCUMENTS

| | | | |
|---|---|---|---|
| JP | 2000-163031 | A | 6/2000 |
| JP | 2002-342033 | A | 11/2002 |
| JP | 2004-004857 | A | 1/2004 |
| WO | WO-2012/161704 | A1 | 11/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph Feild
*Assistant Examiner* — Gustavo Polo
(74) *Attorney, Agent, or Firm* — Morrison & Foerster LLP

(57) ABSTRACT

Updating an image of a display is provided by scanning rows of sub-pixels of the display by applying voltages to pixel electrodes of adjacent sub-pixels in different lines such that polarity changes in opposite directions can occur in two sub-pixels that are adjacent to a particular sub-pixel. In one example, a positive-polarity voltage can be applied to one sub-pixel that is adjacent to a particular sub-pixel, causing a swing in the polarity of the sub-pixel from negative to positive. A negative-polarity voltage can be applied to another sub-pixel that is adjacent to the particular sub-pixel, swinging the polarity of the pixel electrode from positive to negative. A change in brightness of the particular sub-pixel that may result from a voltage swing one direction in an adjacent sub-pixel may be offset by a change in brightness of the particular sub-pixel that may result from a voltage swing in another adjacent sub-pixel.

21 Claims, 8 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2006/0026521 | A1 | 2/2006 | Hotelling et al. |
| 2006/0197753 | A1 | 9/2006 | Hotelling |
| 2008/0252587 | A1 | 10/2008 | Wang |
| 2008/0266284 | A1 | 10/2008 | Shie |
| 2009/0102831 | A1 | 4/2009 | Hashimoto |
| 2010/0110114 | A1 | 5/2010 | Hashimoto |
| 2010/0195004 | A1 | 8/2010 | Hotelling |
| 2010/0315402 | A1 | 12/2010 | Hashimoto |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Aug. 26, 2011, for PCT Application No. PCT/US2011/037811, filed May 24, 2011, four pages.

SCANNING ORDERS IN INVERSION SCHEMES OF DISPLAYS

This application is a United States National Stage Application under 35 U.S.C. §371 of International Patent Application No. PCT/US2011/037811, filed May 24, 2011, which is incorporated by reference in its entirety for all purposes.

FIELD OF THE DISCLOSURE

This relates generally to scanning lines of sub-pixels of a display in a scanning order, and more particularly, to scanning orders in inversion schemes of displays.

BACKGROUND OF THE DISCLOSURE

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, audio and video players, gaming systems, and so forth). LCD devices, for example, typically provide a flat display in a relatively thin package that is suitable for use in a variety of electronic goods. In addition, LCD devices typically use less power than comparable display technologies, making them suitable for use in battery-powered devices or in other contexts where it is desirable to minimize power usage.

LCD devices typically include multiple picture elements (pixels) arranged in a matrix. The pixels may be driven by scanning line and data line circuitry to display an image on the display that can be periodically refreshed over multiple image frames such that a continuous image may be perceived by a user. Individual pixels of an LCD device can permit a variable amount light from a backlight to pass through the pixel based on the strength of an electric field applied to the liquid crystal material of the pixel. The electric field can be generated by a difference in potential of two electrodes, a common electrode and a pixel electrode. In some LCDs, such as electrically-controlled birefringence (ECB) LCDs, the liquid crystal can be in between the two electrodes. In other LCDs, such as in-plane switching (IPS) and fringe-field switching (EPS) LCDs, the two electrodes can be positioned on the same side of the liquid crystal. In many displays, the direction of the electric field generated by the two electrodes can be reversed periodically. For example, LCD displays can scan the pixels using various inversion schemes, in which the polarities of the voltages applied to the common electrodes and the pixel electrodes can be periodically switched, i.e., from positive to negative, or from negative to positive. As a result, the polarities of the voltages applied to various lines in a display panel, such as data lines used to charge the pixel electrodes to a target voltage, can be periodically switched according to the particular inversion scheme.

SUMMARY

The following description includes examples of scanning lines (e.g., rows) of sub-pixels of a display screen by applying voltages to pixel electrodes of adjacent sub-pixels in different lines such that polarity changes in opposite directions can occur in two sub-pixels that are adjacent to a particular sub-pixel. For example, a positive-polarity voltage can be applied to the pixel electrode of one sub-pixel that is adjacent to a particular sub-pixel. The application of positive-polarity voltage can swing the polarity of the pixel electrode from negative to positive, i.e., a positive direction change. A negative-polarity voltage can be applied to another sub-pixel that is adjacent to the particular sub-pixel, swinging the polarity of the pixel electrode from positive to negative, i.e., a negative direction change. In this way, for example, a change in brightness of the particular sub-pixel that may result from a voltage swing one direction in an adjacent sub-pixel may be offset by a change in brightness of the particular sub-pixel that may result from a voltage swing in another adjacent sub-pixel.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of scanning lines (e.g., rows) of sub-pixels of a display screen by applying voltages to pixel electrodes of adjacent sub-pixels in different lines such that polarity changes in opposite directions can occur in two sub-pixels that are adjacent to a particular sub-pixel. For example, a positive-polarity voltage can be applied to the pixel electrode of one sub-pixel that is adjacent to a particular sub-pixel. The application of positive-polarity voltage can swing the polarity of the pixel electrode from negative to positive, i.e., a positive direction change. A negative-polarity voltage can be applied to another sub-pixel that is adjacent to the particular sub-pixel, swinging the polarity of the pixel electrode from positive to negative, i.e., a negative direction change. In this way, for example, a change in brightness of the particular sub-pixel that may result from a voltage swing one direction in an adjacent sub-pixel may be offset by a change in brightness of the particular sub-pixel that may result from a voltage swing in another adjacent sub-pixel.

Figure 1A:
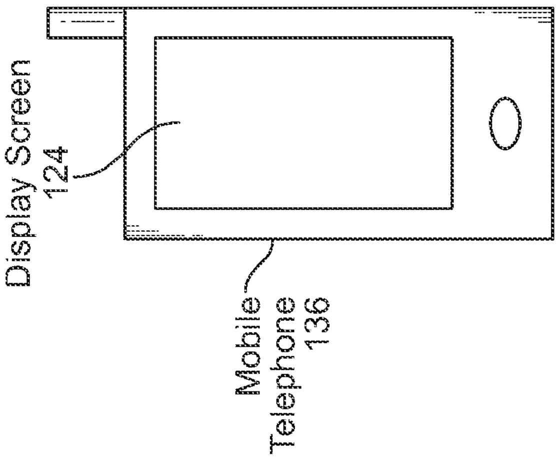
FIGS. 1A-1D illustrate an example mobile telephone, an example media player, an example personal computer, and an example display that each include an example display screen that can be scanned according to embodiments of the disclosure.
Figure 1B:
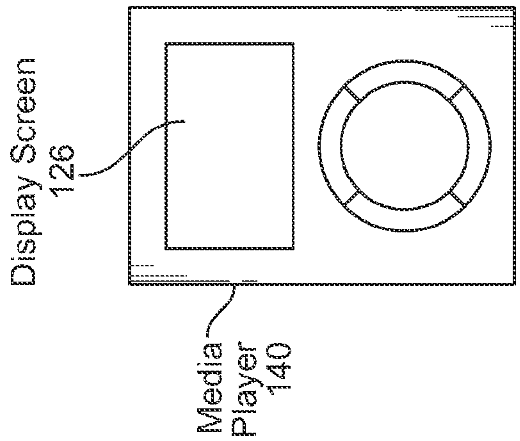
Figure 1C:
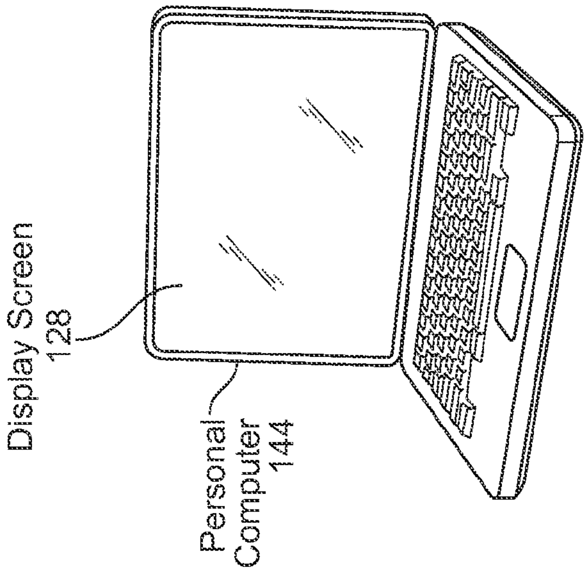
Figure 1D:
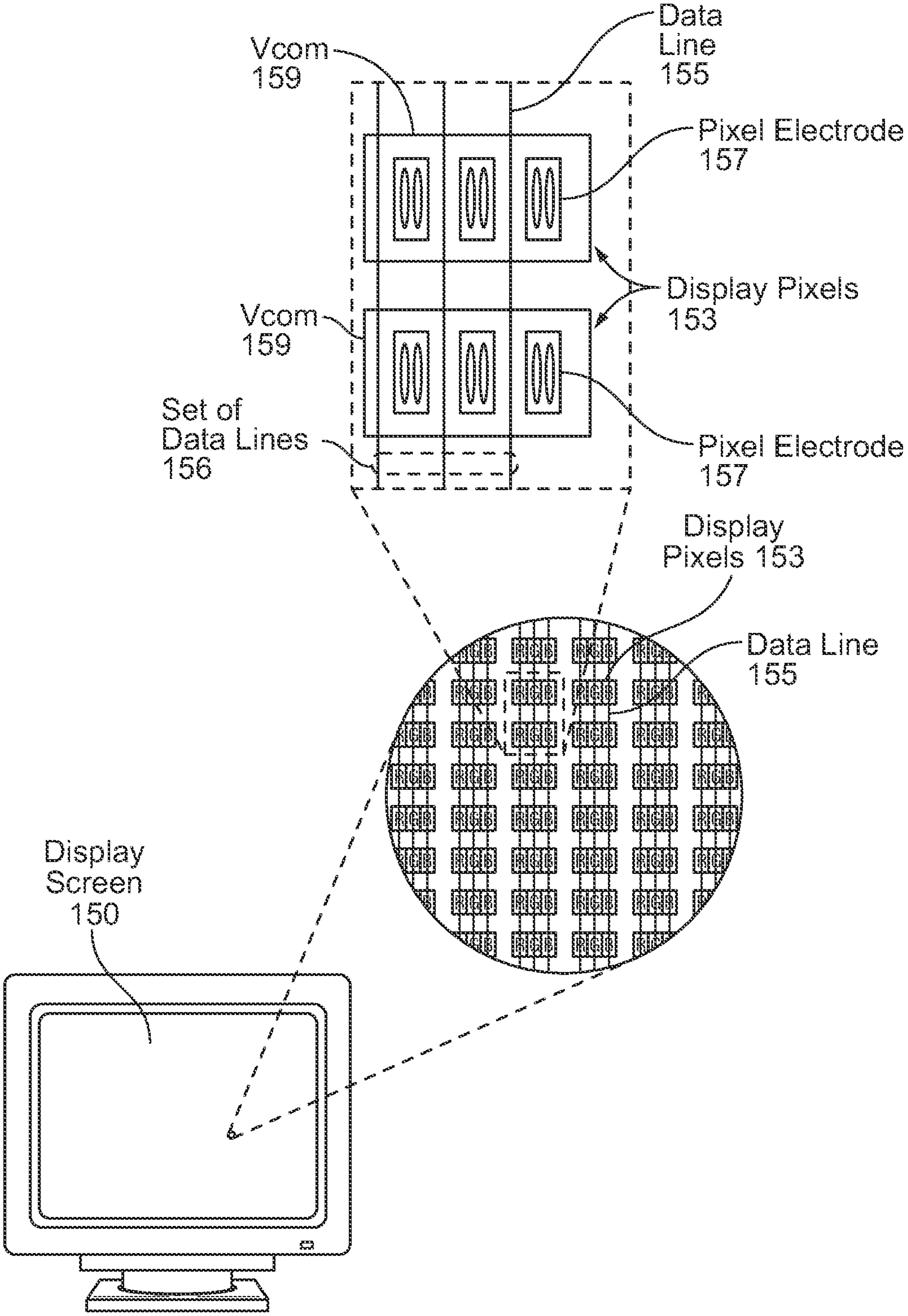

FIGS. 1A-1D show example systems that can include display screens that can be scanned according to embodiments of the disclosure. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128. FIG. 1D illustrates an example display screen 150, such as a standalone display. In some embodiments, display screens 124, 126, 128, and 150 can be touch screens that include touch sensing circuitry. In some embodiments, touch sensing circuitry can be integrated into the display pixels.

FIG. 1D illustrates some details of example display screen 150. FIG. 1D includes a magnified view of display screen 150 that shows multiple display pixels 153, each of which can include multiple display sub-pixels, such as red (R), green (G), and blue (B) sub-pixels in an RGB display. Although various embodiments are described with respect to display pixels, one skilled in the art would understand that the term display pixels (or simply "pixels") can be used interchangeably with the term display sub-pixels (or simply "sub-pixels") in embodiments in which display pixels include multiple sub-pixels. For example, some embodiments directed to RGB displays can include display pixels divided into red, green, and blue sub-pixels. In other words, each sub-pixel can be a red (R), green (G), or blue (B) sub-pixel, with the combination of all three R, G, and B sub-pixels forming one display pixel.

Data lines 155 can run vertically through display screen 150, such that each display pixel in a column of display pixels can include a set 156 of three data lines (an R data line, a G data line, and a B data line) corresponding to the three sub-pixels of each display pixel. In some embodiments, each data line 155 in set 156 can be operated concurrently during the update of a corresponding sub-pixel. For example, a display driver can apply the target voltages of data lines 155 concurrently to the data lines in set 156 to update the sub-pixels of a display pixel. In some embodiments, the three data lines in each display pixel can be operated sequentially. For example, a display driver can multiplex an R data voltage, a G data voltage, and a B data voltage onto a single bus line, and then a demultiplexer in the border region of the display can demultiplex the R, G, and B data voltages to apply the data voltages to the corresponding data lines in the particular sequence.

FIG. 1D also includes a magnified view of two of the display pixels 153, which illustrates that each display pixel can include pixel electrodes 157, each of which can correspond to one of the sub-pixels, for example. Each display pixel can include a common electrode (Vcom) 159 that can be used in conjunction with pixel electrodes 157 to create an electrical potential across a pixel material (not shown). Varying the electrical potential across the pixel material can correspondingly vary an amount of light emanating from the sub-pixel. In some embodiments, for example, the pixel material can be liquid crystal. A common electrode voltage can be applied to a Vcom 159 of a display pixel, and a data voltage can be applied to a pixel electrode 157 of a sub-pixel of the display pixel through the corresponding data line 155. A voltage difference between the common electrode voltage applied to Vcom 159 and the data voltage applied to pixel electrode 157 can create the electrical potential across the liquid crystal of the sub-pixel. The electrical potential between Vcom 159 and pixel electrode 157 can generate an electric field through the liquid crystal, which can cause inclination of the liquid crystal molecules to allow polarized light from a backlight (not shown) to emanate from the sub-pixel with a luminance that depends on the strength of the electric field (which can depend on the voltage difference between the applied common electrode voltage and data voltage). In other embodiments, the pixel material can include, for example, a light-emitting material, such as can be used in organic light emitting diode (OLED) displays.

In some scanning methods, the direction of the electric field across the pixel material can be reversed periodically. In LCD displays, for example, periodically switching the direction of the electric field can help prevent the molecules of liquid crystal from becoming stuck in one direction. Switching the electric field direction can be accomplished by reversing the polarity of the electrical potential between the pixel electrode and the Vcom. In other words, a positive potential from the pixel electrode to the Vcom can generate an electric field across the liquid crystal in one direction, and a negative potential from the pixel electrode to the Vcom can generate an electric field across the liquid crystal in the opposite direction. In some scanning methods, switching the polarity of the potential between the pixel electrode and the Vcom can be accomplished by switching the polarities of the voltages applied to the pixel electrode and the Vcom. For example, during an update of an image in one frame, a positive voltage can be applied to the pixel electrode and a negative voltage can be applied to the Vcom. In a next frame, a negative voltage can be applied to the pixel electrode and a positive voltage can be applied to the Vcom. One skilled in the art would understand that switching the polarity of the potential between the pixel electrode and the Vcom can be accomplished without switching the polarity of the voltage applied to either or both of the pixel electrode and Vcom. In this regard, although example embodiments are described herein as switching the polarity of voltages applied to data lines, and correspondingly, to pixel electrodes, it should be understood that reference to positive/negative voltage polarities can represent relative voltage values. For example, an application of a negative polarity voltage to a data line, as described herein, can refer to application of a voltage with a positive absolute value (e.g., +1V) to the data line, while a higher voltage is being applied to the Vcom, for example. In other words, in some cases, a negative polarity potential can be created between the pixel electrode and the Vcom by applying positive (absolute value) voltages to both the pixel electrode and the Vcom, for example.

The brightness (or luminance) of the corresponding pixel or sub-pixel depends on the magnitude of the difference between the pixel electrode voltage and the Vcom voltage. For example, the magnitude of the difference between a pixel electrode voltage of +2V and a Vcom voltage of −3V is 5V. Likewise, the magnitude of the difference between a pixel electrode voltage of −2V and a Vcom voltage of +3V is also 5V. Therefore, in this example, switching the polarities of the pixel electrode and Vcom voltages from one frame to the next would not change the brightness of the pixel or sub-pixel.

Various inversion schemes can be used to periodically switch the polarities of the pixel electrodes and the Vcoms. In a single line inversion scheme, for example, when the scanning of a first frame is completed, the location of the positive and negative polarities on the pixel electrodes can be in a pattern of rows of the display that alternates every single row, e.g., the first row at the top of the display screen having positive polarities, the second row from the top having negative polarities, the third row from the top having positive polarities, etc. In a subsequent frame, such as the second frame, the pattern of voltage polarities can be reversed, e.g., the first row with negative polarities, the second row with positive polarities, etc.

During the scanning operation in single line inversion, the rows can be updated in a scanning order that is the same as the order of the position of the rows from a first row at the top of the display screen to a last row at the bottom of the display screen. For example, the first row at the top of the display can be updated first, then the second row from the top can be updated second, then the third row from the top can be updated third, etc. In this way, there can be a repeating timing pattern of voltage polarity swings on the data lines during the scanning operation. In other words, repeatedly switching the voltages on the data lines from positive to negative to positive to negative, etc., during the scanning operation results in a repeating timing pattern of positive and negative voltage swings. In single line inversion, for example, there is one positive voltage swing after one row is updated, and one negative voltage swing after the next row in the scanning order is updated. Thus, the timing pattern of positive/negative voltage swings repeats after the updating of each block of two adjacent rows in single line inversion.

In some line inversion schemes, the location of the positive and negative polarities on the pixel electrodes can be in a pattern of rows of the display that alternates every two rows (for 2-line inversion), every three rows (for 3-line inversion), every four rows (for 4-line inversion), etc. In a 2-line inversion scheme, for example, when the scanning of a first frame is completed, the location of the positive and negative polarities on the pixel electrodes can be in a pattern of rows of the display that alternates every two rows, e.g., the first and second rows at the top of the display screen having positive polarities, the third and fourth rows from the top having negative polarities, the fifth and sixth rows from the top having positive polarities, etc. In a subsequent frame, such as the second frame, the pattern of voltage polarities can be reversed, e.g., the first and second rows with negative polarities, the third and fourth rows with positive polarities, etc. In general, the location of positive and negative polarities on the pixel electrodes in an M-line inversion scheme can alternate every M rows.

Voltage swings on the data lines in an M-line inversion scheme can repeat every 2M rows. In other words, there is one positive voltage swing after M rows are updated, and one negative voltage swing after the next M rows in the scanning order are updated. Thus, the timing pattern of positive and negative changes in voltage polarity repeats after the scanning of each block of 2M adjacent rows in M-line inversion.

In a reordered M-line inversion scheme, the location of the resulting pattern of alternating positive and negative polarities on the pixel electrodes can be the same pattern as in regular single line inversion described above, i.e., alternating polarity every single row. However, while the regular line inversion schemes described above can update the rows in the sequential order of row position, in a reordered line inversion scheme, the rows can be updated in an order that is not sequential. In one example reordered 4-line inversion scheme, the scanning order can update four rows in a block of eight rows with positive polarity and update the other four rows in the block with negative polarity. However, unlike regular 4-line inversion, the scanning order of reordered 4-line inversion can update, for example, update rows 1, 3, 5, and 7 with positive polarity voltages, and then update rows 2, 4, 6, and 8 with negative polarity voltages. Therefore, in this example reordered 4-line inversion scheme, the timing pattern of positive/negative voltage swings can repeat after the updating of 8 rows (i.e., after the updating of 2M rows for a reordered M-line inversion scheme), which is similar to regular 4-line inversion. However, the pattern of the location of alternating positive and negative pixel electrodes can repeat every single row, which is similar to regular single line inversion. In this way, for example, reordered line inversion schemes can reduce the number of voltage polarity swings on the data lines during the scanning of a single frame, while maintaining a row-by-row location of alternating polarities. In the context of this document, in a reordered M-line inversion scheme, M is an integer greater than one.

Thus, the particular order and location in which voltages of different polarities are applied to the pixel electrodes of sub-pixels of a display can depend on the particular inversion scheme being used to scan the display.

As will be described in more detail below with respect to various example embodiments, applying a voltage to a sub-pixel in one row of pixels can affect the voltages of sub-pixels in other rows of pixels. For example, a capacitance that can exist between pixel electrodes can allow a large voltage swing (for example, from a positive polarity voltage to a negative polarity voltage, or vice-versa) on the pixel electrode of one sub-pixel (which may be referred to herein as an “aggressor sub-pixel,” or simply an “aggressor pixel”) to be coupled into a pixel electrode in an adjacent row, which can result in a change in the voltage of the pixel electrode in the adjacent row. The change in the voltage of the pixel electrode in the adjacent row can cause an erroneous increase or decrease in the brightness of the sub-pixel (which may be referred to herein as a “victim sub-pixel,” or simply a “victim pixel”) with the affected pixel electrode. In some cases, the erroneous increase or decrease in victim pixel brightness can be detectable as a visual artifact in the displayed image. As will be apparent from the description below, some sub-pixels can be an aggressor during the update of the sub-pixel’s row and can be a victim during the update of another row.

Figure 2:
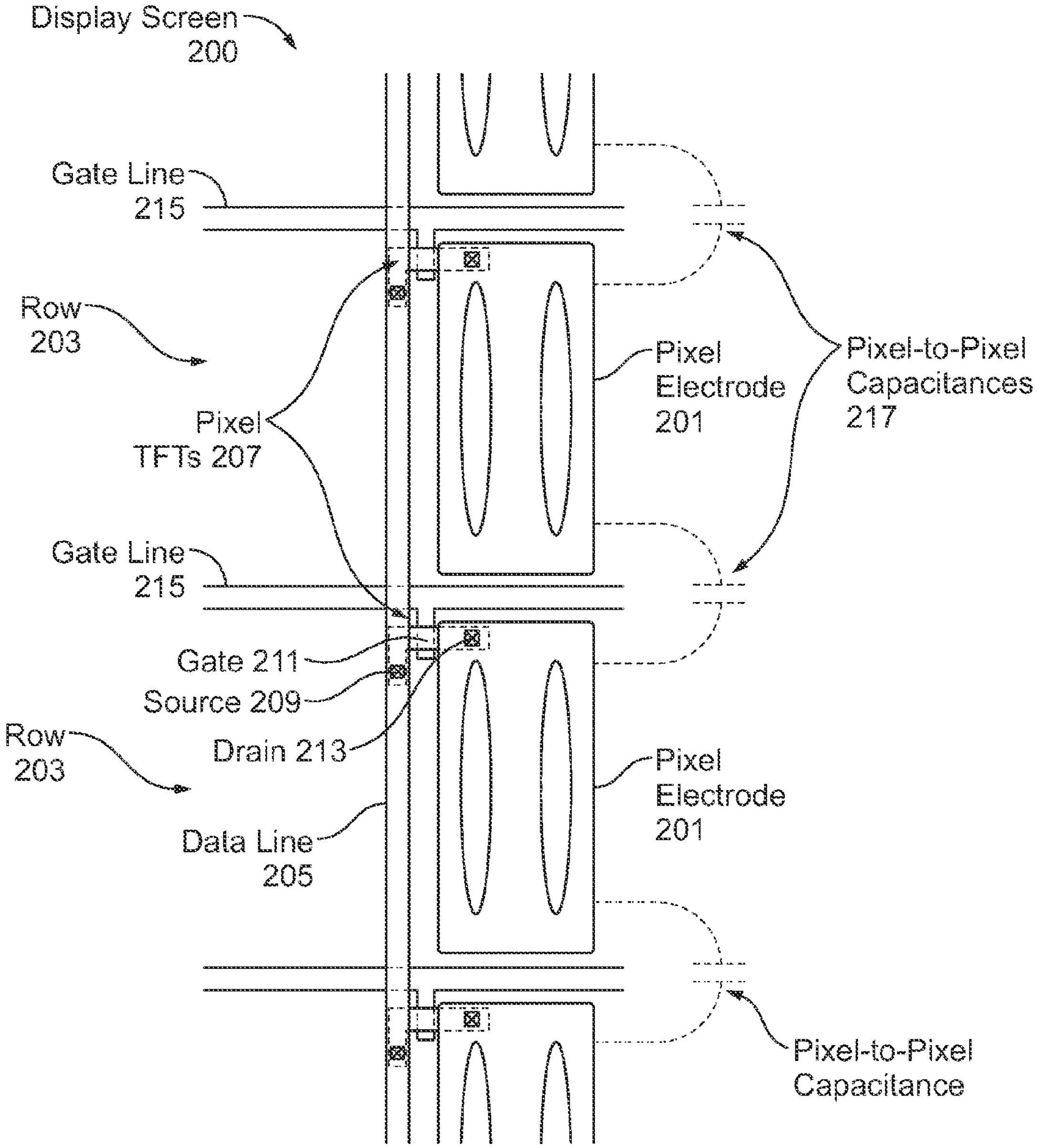
FIG. 2 illustrates an example arrangement of pixel electrodes in an example display screen.

FIG. 2 illustrates an example arrangement of pixel electrodes 201 in an example display screen 200. Pixel electrodes 201 can have an arrangement similar to pixel electrodes 157 in FIG. 1D, for example, in which the pixel electrodes can be arranged in horizontal lines, such as rows 203. For the purpose of clarity, other pixel electrodes in rows 203 of display screen 200 are not shown in this figure. Pixel electrodes 201 shown in FIG. 2 can each be associated with a data line 205, such as data line 155 in FIG. 1D. Each pixel TFT 207 can include a source 209 connected to data line 205, a gate 211, and a drain 213 connected to pixel electrode 201. Each pixel TFT 207 in one row 203 of pixels can be switched on by applying an appropriate gate line voltage to a gate line 215 corresponding to the row. During a scanning operation of display screen 200, a target voltage of each pixel electrode 201 in one row 203 can be applied individually to the pixel electrode by switching on pixel TFTs 207 of the of the row with the corresponding gate line 215 while the target voltages of each pixel electrode in the row are being applied to data lines 205.

To update all of the pixel electrodes 201 in display screen 200, thus refreshing an image frame displayed by the sub-pixels of the display screen, rows 203 can be scanned by applying the appropriate gate line voltages to gate lines 215 in a particular scanning order. For example, a scanning order can be sequential in order of position of rows 203 from a first row at the top of display screen 200 to a last row at the bottom of the display screen. In other words, the first row of the display can be scanned first, then the next adjacent row (i.e., the second row) can be scanned next, then the next adjacent row (i.e., the third row) can be scanned, etc. One skilled in the art would understand that other scanning orders can be used.

When a particular row 203 is being scanned to update the voltages on pixel electrodes 201 of the row with the target data voltages being applied to the data lines 205 during the scanning of the row, pixel TFTs 207 of the other rows can be switched off so that the pixel electrodes in the rows that are not being scanned remain disconnected from the data lines. In this way, data voltages on the data lines can be applied to a single row currently being scanned, while the voltages on the data lines are not applied directly to the pixel electrodes in the other rows.

However, updating the voltages of the pixel electrodes 201 of a particular row 203 can have an effect on the voltages of pixel electrodes in other rows. For example, a pixel-to-pixel capacitance 217 existing between adjacent pixel electrodes 201, for example, can allow voltage changes in one pixel electrode to affect the voltage values of adjacent pixel electrodes through a capacitance coupling between the pixel electrodes.

Figure 3:
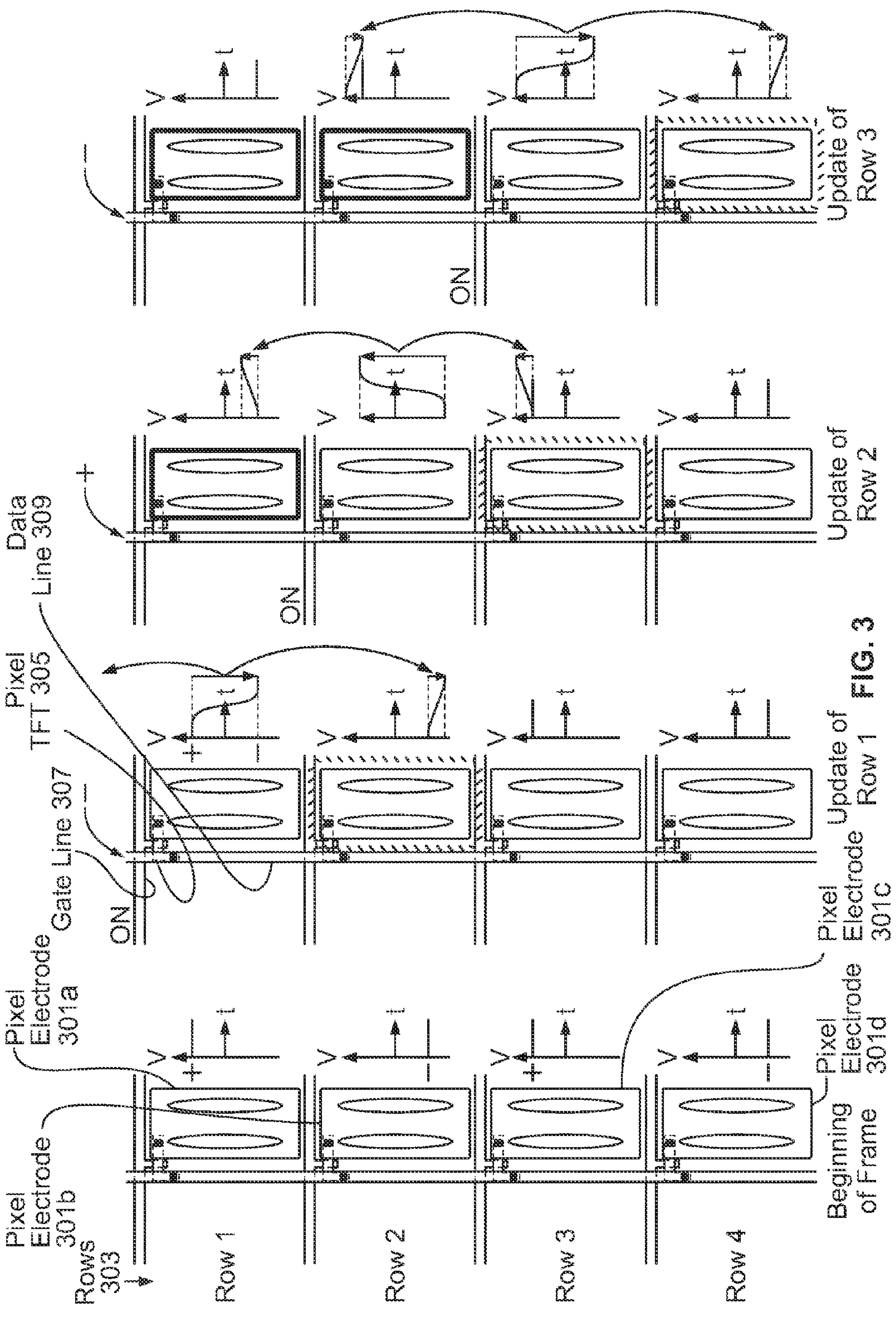
FIG. 3 illustrates the appearance of visual artifacts in an example scanning operation in which rows can be scanned in a line-by-line sequential order.

FIG. 3 illustrates an example scanning operation in which rows can be scanned in a row-by-row sequential order. The inversion scheme shown in FIG. 3 can be, for example, single line inversion (or single dot inversion). The voltages on pixel electrodes 301*a-d* of four rows 303 are represented by voltage graphs next to each pixel electrode, which show the voltage on the pixel electrode during scanning of various rows. At the beginning of the frame, pixel electrode 301*a* of row 1 can have a positive voltage, pixel electrode 301*b* of row 2 can have a negative voltage, pixel electrode 301*c* of row 3 can have a positive voltage, and pixel electrode 301*d* of row 4 can have a negative voltage. The voltages at the beginning of the frame can be, for example, the target voltages that were applied to the pixels during the previous frame. In other words, the voltages of the pixel electrodes 301*a-d* at the beginning of the frame can be the voltages used to display the image of the previous frame. In this example, the polarity of the voltages on the pixel electrodes 301*a-d* can be changed for each scan line (e.g., single line inversion or single dot inversion). FIG. 3 shows a scan of row 1, during which a pixel TFT 305 of a pixel electrode 301*a* of row 1 can be switched on by applying the appropriate gate line voltage to a gate line 307. During the scan of row 1, a negative voltage can be applied to a data line 309 to update the voltage on the pixel electrode of row 1 as shown in the voltage graph next to the pixel electrode. The voltage graph of pixel electrode 301*a* during the scan of row 1 shows a voltage swing from positive voltage to negative voltage, which is represented in the voltage graph by a large down arrow. Due to effects such as the capacitance coupling described above, for example, the large negative voltage swing of pixel electrode 301*a* can cause a corresponding negative voltage swing in adjacent pixel electrodes such as pixel electrode 301*b*. This effect on the voltages on adjacent pixel electrodes can be significantly smaller in magnitude, therefore, the voltage graph of pixel electrode 301*b* shows a slight negative change, which is represented in the voltage graph by a small down arrow, during the scan of row 1. As described above, the luminance of the sub-pixel associated with a pixel electrode can depend on the magnitude of the pixel voltage. The negative voltage change in pixel electrode 301*b* caused by the large negative voltage swing in pixel electrode 301*a* can increase the magnitude of the voltage of pixel electrode 301*b*. Therefore, the effect of the negative voltage swing on pixel electrode 301*a* can be an increase in the luminance, e.g., brightness, of the sub-pixel of pixel electrode 301*b*. The increase in brightness sub-pixel of pixel electrode 301*b* is represented in FIG. 3 by hatch marks surrounding pixel electrode 301*b*.

In the scan of row 2, pixel TFT 305 of pixel electrode 301*b* can be switched on with a gate line voltage applied to the corresponding gate line 307, while the pixel TFTs of the other rows can remain off. While pixel electrode 301*b* is connected to data line 309 during the scan of row 2, a positive target voltage can be applied to the data line to update the voltage of pixel electrode 301*b*. The voltage graph of pixel electrode 301*b* illustrates that the application of the positive voltage causes a large positive voltage swing on pixel electrode 301*b*, which is represented by the large up arrow in the voltage graph. A large positive swing in voltage on pixel electrode 301*b* can affect the voltages of adjacent pixel electrodes 301*a* and 301*c* correspondingly, resulting in relatively smaller positive changes in voltage on the two adjacent pixel electrodes. The smaller positive voltage swings in the adjacent pixel electrodes are represented in the corresponding voltage graphs by small up arrows. The positive voltage change on pixel electrode 301*a* can cause the negative voltage on the pixel electrode to be reduced in magnitude, which can result in decrease in the brightness of the sub-pixel of pixel electrode 301*a*. In other words, the brightness of the sub-pixel of pixel electrode 301*a* can be reduced such that the sub-pixel appears darker, which is represented in FIG. 3 by the thicker, dark borders shown on pixel electrode 301*a* in the scan of row 2.

The large positive voltage swing on pixel electrode 301*b* can result in an increase in the brightness of the sub-pixel of pixel electrode 301*c* because the positive change to the voltage on pixel electrode 301*c* can increase the magnitude of the voltage on pixel electrode 301*c*. The increase in brightness of pixel electrode 301*c* is represented in FIG. 3 by hatch marks surrounding pixel electrode 301*c*.

In the scan of row 2, the application of the target voltage to pixel electrode 301*b* can correct, or overwrite, the erroneous increase in brightness introduced previously. For example, in the scan of row 1, the brightness of the sub-pixel of pixel electrode 301*b* was increased, making the sub-pixel appear brighter, due to the voltage swing occurring on pixel electrode 301*a*. While this increased brightness of pixel electrode 301*b* might otherwise be visible as a display artifact, in this case, the erroneous increase in brightness can be quickly overwritten in the scan of row 2, which immediately follows the scan of row 1. In other words, in the scan of row 2, the voltage on pixel electrode 301*b* is updated to the target voltage for the sub-pixel regardless of whether the pixel electrode 301*b* is being update from a correct voltage (i.e., the target voltage from the previous frame) or updated from an incorrect voltage (e.g., an erroneously higher or lower voltage). Therefore, pixel electrode 301*b* is shown during the scan of row 2 in FIG. 3 with the hatch marks removed. In other words, the scan of row 2 can overwrite the erroneous voltage on pixel electrode 301*b* with the current target voltage.

During a scan of row 3, pixel TFT 305 corresponding to pixel electrode 301*c* can be switched on, as described above. A negative target voltage can be applied to data line 309, which can cause the voltage on pixel electrode 301*c* to swing from positive to negative as represented by the large down arrow in the voltage graph. The negative swing in voltage on pixel electrode 301*c* can cause negative voltage changes on pixel electrodes 301*b* and 301*d*, causing a decrease in the magnitude of the positive voltage on pixel electrode 301*b* and an increase in magnitude of the voltage on pixel electrode 301*d*. Thus, as before, updating the voltage on pixel electrode 301*c* can affect adjacent sub-pixels by causing the sub-pixel of pixel electrode 301*b* to appear darker and the sub-pixel of pixel electrode 301*d* to appear brighter.

Figure 4:
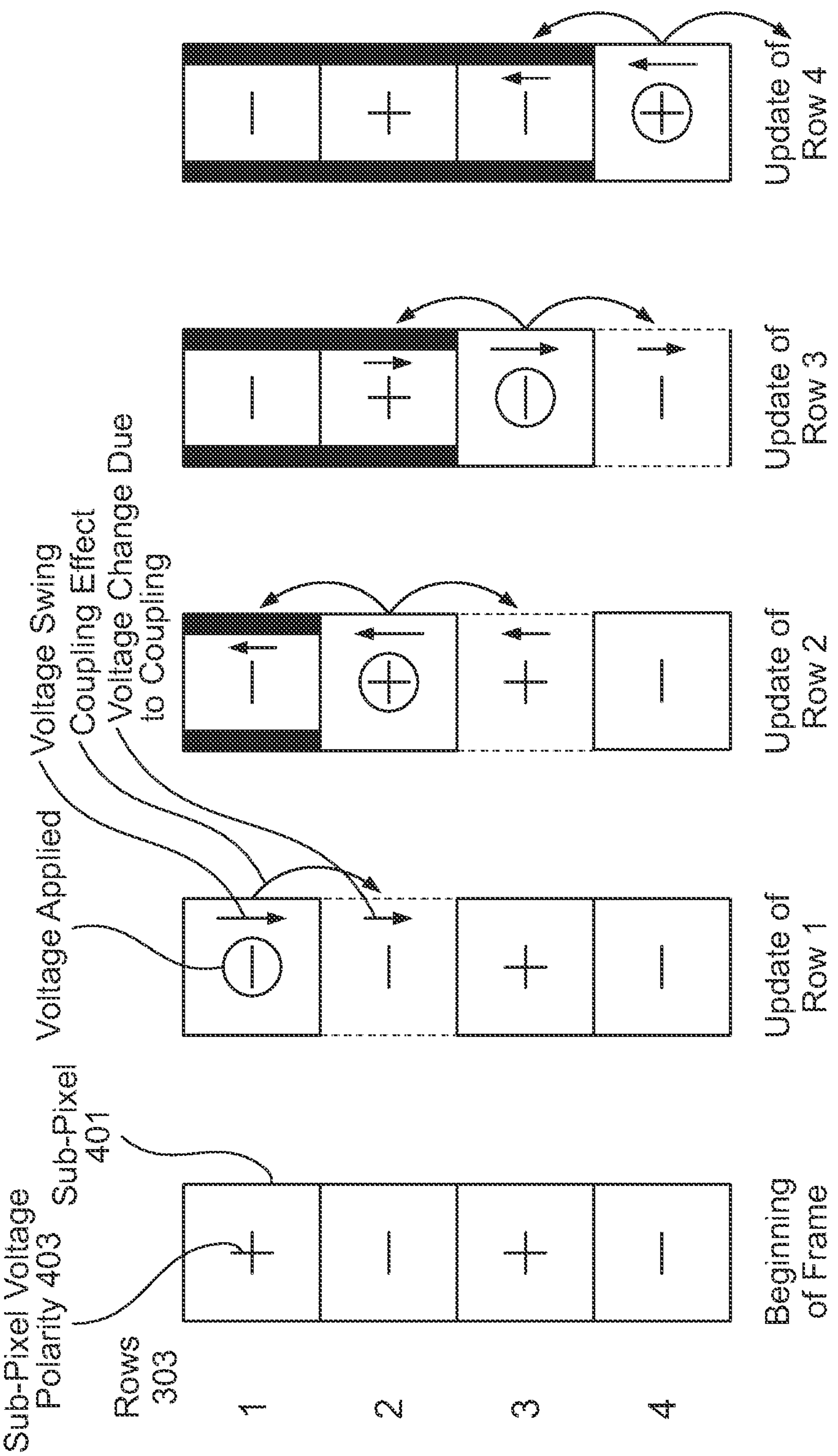
FIG. 4 shows another representation of the example scanning operation shown in FIG. 3.

FIG. 4 shows another representation of the example scanning operation shown in FIG. 3. Specifically, FIG. 4 illustrates a simplified notation for describing various effects on sub-pixel brightness that can occur during scanning operations. The notation illustrated in FIG. 4 will be adopted below in the descriptions of additional example embodiments shown in FIGS. 5 and 6.

FIG. 4 illustrates rows 303 including sub-pixels 401 corresponding to the sub-pixels of pixel electrodes 301*a-d* of FIG. 3. Sub-pixel voltage polarities 403 associated with each sub-pixel 401 are shown in FIG. 4. The sub-pixel voltage polarities 403 correspond to the polarities of the voltages on pixel electrodes 301*a-d* shown in FIG. 3. FIG. 4 illustrates the voltage polarities 403 on the sub-pixels 401 of rows 1-4 at the beginning of the frame, corresponding to FIG. 3. As described above, during the update of row 1, a target voltage is applied to the pixel electrode (i.e., pixel electrode 301*a*) of sub-pixel 401 in row 1. The direct application of voltage to a pixel electrode is illustrated in the figures with the notation of a circle around the polarity sign of the applied voltage in the sub-pixel. A large voltage swing on a pixel electrode of a sub-pixel due to a direct application of voltage to the pixel electrode is illustrated in the figures with the notation of a large up-arrow, corresponding to a positive voltage swing, or a large down-arrow, corresponding to a negative voltage swing, in the sub-pixel.

In the update of row 1 shown in FIG. 4, for example, the negative target voltage applied to sub-pixel 401 of row 1 can cause a negative voltage swing because the sub-pixel voltage polarity 403 of the sub-pixel was positive at the beginning of the update of row 1, e.g., at the beginning of the frame. As described above, the negative voltage swing can cause a corresponding negative voltage change on sub-pixel 401 of row 2, which is illustrated in the figures with the notation of a small down-arrow (or a small up-arrow for positive voltage changes). Also as described above, the negative voltage change can cause sub-pixel 401 of row 2 to appear brighter, which is illustrated in the figures with the notation of dashed lines used for the left and right borders of the sub-pixel.

In the update of row 2 shown in FIG. 4, a positive polarity target voltage can be applied to sub-pixel 401 of row 2, which can cause a large positive voltage swing on the sub-pixel. As described above, sub-pixel 401 of row 1 can be affected by becoming darker due to the corresponding positive voltage change to the negative polarity voltage on the sub-pixel of row 1. The decrease in brightness, e.g., darker appearance, of sub-pixel 401 of row 1 is illustrated in the figures with the notation of thick, dark lines used for the left and right borders of the sub-pixel. As described above, sub-pixel 401 of row 3 can appear brighter due to the positive voltage change caused by the voltage swing on the pixel electrode (i.e., pixel electrode 301*b*) of sub-pixel 401 of row 2. Thus, the left and right borders of sub-pixel 401 of row 3 are shown as dashed lines in FIG. 4. The update of row 3 shown in FIG. 4 likewise represents the above-described update of row 3, including the application of negative polarity target voltage to sub-pixel 401 of row 3, a large negative swing on the corresponding pixel electrode, and a resulting decrease and increase in the brightness of the sub-pixels of row 2 and row 4, respectively.

FIG. 4 also illustrates the update of row 4, in which the change in polarity of sub-pixel 401 of row 4 can result in a decrease in the brightness of the preceding sub-pixel of row 3, and an increase in the brightness of the next sub-pixel of row 5 (not shown). Thus, it can be seen from FIG. 4 that the scanning of each row under the particular inversion scheme of the present example, i.e., single line inversion (or single dot inversion), can result in a decrease in brightness of the sub-pixels in preceding rows and an increase in brightness of the sub-pixels in the next rows. However, the increase in brightness of the next row can be subsequently overwritten in the next scan step, leaving only the decreases in brightness of each sub-pixel of the display.

A uniform decrease (or increase) in brightness of all sub-pixels may not be detectable as a visual artifact. In other words, the particular order of scanning in some types of inversion schemes may mask the effects of pixel-to-pixel coupling on sub-pixel luminance. On the other hand, some types of inversion schemes may exacerbate visual artifacts that can result from pixel-to-pixel coupling.

Figure 5:
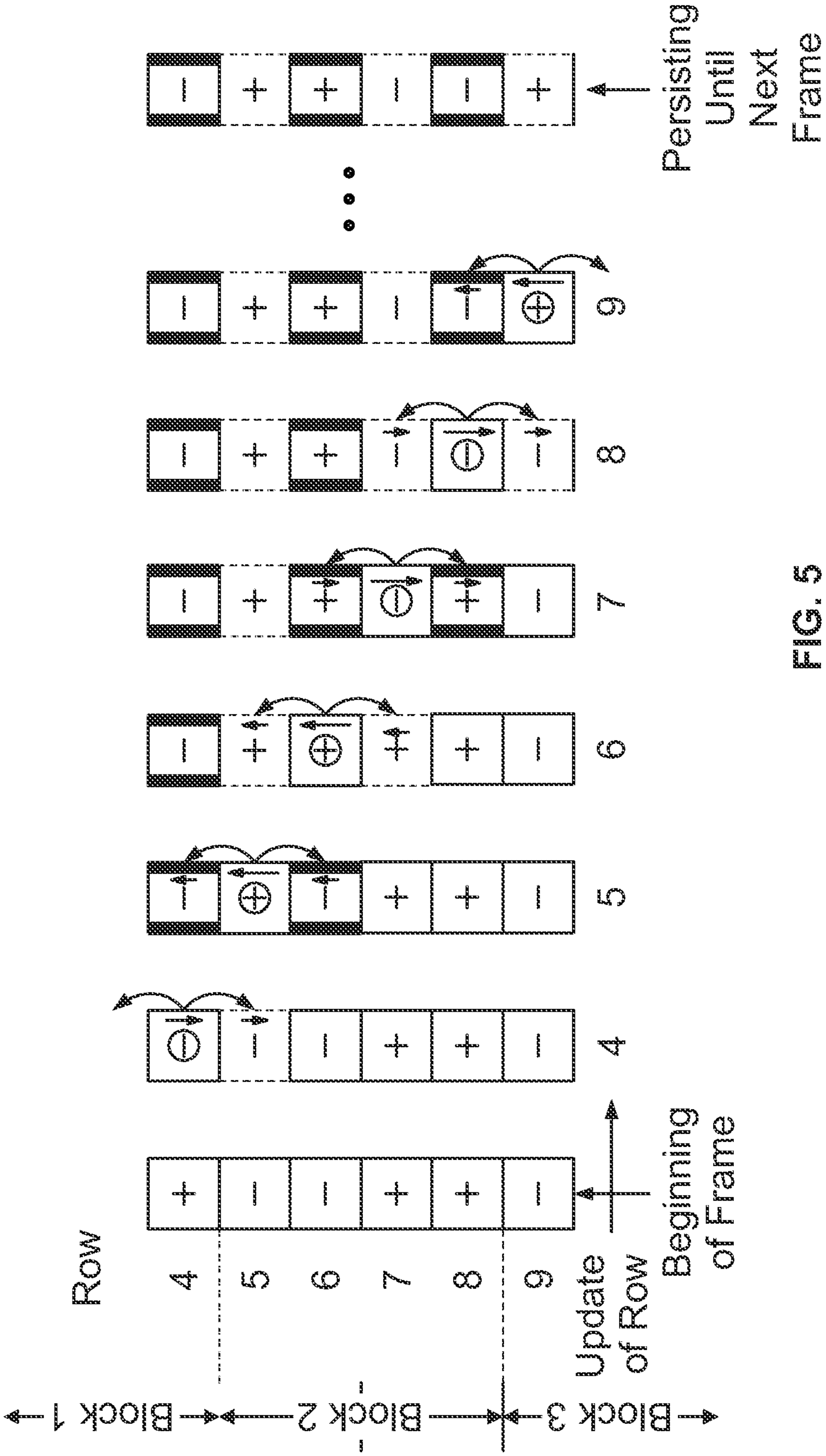
FIG. 5 illustrates an example scanning operation to update an image frame of a display using an example scanning order including a 2-line (or 2-dot) inversion scheme.

FIG. 5 illustrates an example scanning operation to update an image frame of a display using an example scanning order including a 2-line (or 2-dot) inversion scheme. The example scanning operation shown in FIG. 5 can result in erroneous changes in the brightness of some sub-pixels, but not other sub-pixels in the frame. In this example scanning operation, the changes in brightness can include decreases in brightness. The unaffected sub-pixels and the darker sub-pixels can create a pattern of different brightness levels on the display screen, which may be detectable as a visual artifact.

FIG. 5 shows the complete scanning of a block of four rows of the reordered 2-line inversion scheme, i.e., block 2, which includes rows 5-8. FIG. 5 also illustrates the updating of an adjacent row above block 2 (i.e., row 4), which is the last row in block 1, and the updating of an adjacent row after block 2 (i.e., row 9), which is the first row in block 3. Because FIG. 5 illustrates the updating of multiple rows over the course of the scanning operation, for the sake of clarity FIG. 5 (and other figures herein) shows only one sub-pixel per row. The representative sub-pixel of a particular row shown in the figures may be referred to by the row number in which the sub-pixel is located (e.g., the illustrated sub-pixel in row 5 may be referred to herein simply as sub-pixel 5). However, it is understood that each row can include multiple sub-pixels. It is further understood that the other sub-pixels in each row can have the same and/or different polarities as the polarity of the representative sub-pixel, depending on the particular inversion scheme being used, such as dot inversion, line inversion, etc.

At the beginning of the frame, the voltage polarities of the sub-pixels in the first and second rows of block 2 (i.e., sub-pixels 5 and 6) can be negative, and the voltage polarities of the sub-pixels in the third and fourth rows of block 2 (i.e., sub-pixels 7 and 8) can be positive. In this example scanning order of the 2-line inversion scheme, the rows can be scanned in a row-by-row sequential order, such that the first row is updated first, then the second row is updated, then the third row is updated, etc.

Scanning of the display in the frame can begin with the update of the first row in the block 1 (i.e., row 1, not shown) and continue with the scanning of rows 2 and 3 (not shown), until scanning reaches row 4. FIG. 5 illustrates the scanning of row 4, during which a negative voltage can be applied to the pixel electrode of sub-pixel 4 to update the sub-pixel to its target voltage for the frame. Updating sub-pixel 4 can result in a large negative swing in voltage, which can cause a corresponding negative change to the negative voltage of the sub-pixel of row 5 (i.e., sub-pixel 5), resulting in an increase in the brightness of sub-pixel 9. After the updating of row 4, the scanning of block 1 can be complete.

The scanning of block 2 can begin with updating of row 5 (i.e., the 1st row of block 2) with a positive target voltage, which can overwrite the erroneous increase in the brightness of sub-pixel 5 that occurred during the update of sub-pixel 4 and can cause a positive voltage change affecting the adjacent sub-pixels with a positive change to the negative voltage of sub-pixel 4 and the negative voltage of sub-pixel 6, resulting in a decrease in brightness of sub-pixel 4 and a decrease in brightness of sub-pixel 6. Scanning block 2 can continue with the updating of sub-pixel 6, which can result in increases in the brightness of sub-pixels 5 and 7. The scanning of block 2 can continue with the updating of sub-pixel 7, which can result in decreases in the brightness of sub-pixels 6 and 8. The updating of sub-pixel 8 can result in increases in the brightness of sub-pixels 7 and 9, and the updating of sub-pixel 9 can result in decreases in the brightness of sub-pixel 8.

FIG. 5 shows the resulting increases and decreases in brightness of the sub-pixels, which can persist until the next frame and can appear as visual artifacts. Specifically, the visual artifacts can include erroneous decreases in brightness of sub-pixels 4, 6, and 8 and erroneous increases in brightness of sub-pixels 5, 7, and 9 (sub-pixel 9 being affected by the updating of sub-pixel 10, not shown).

Figure 6:
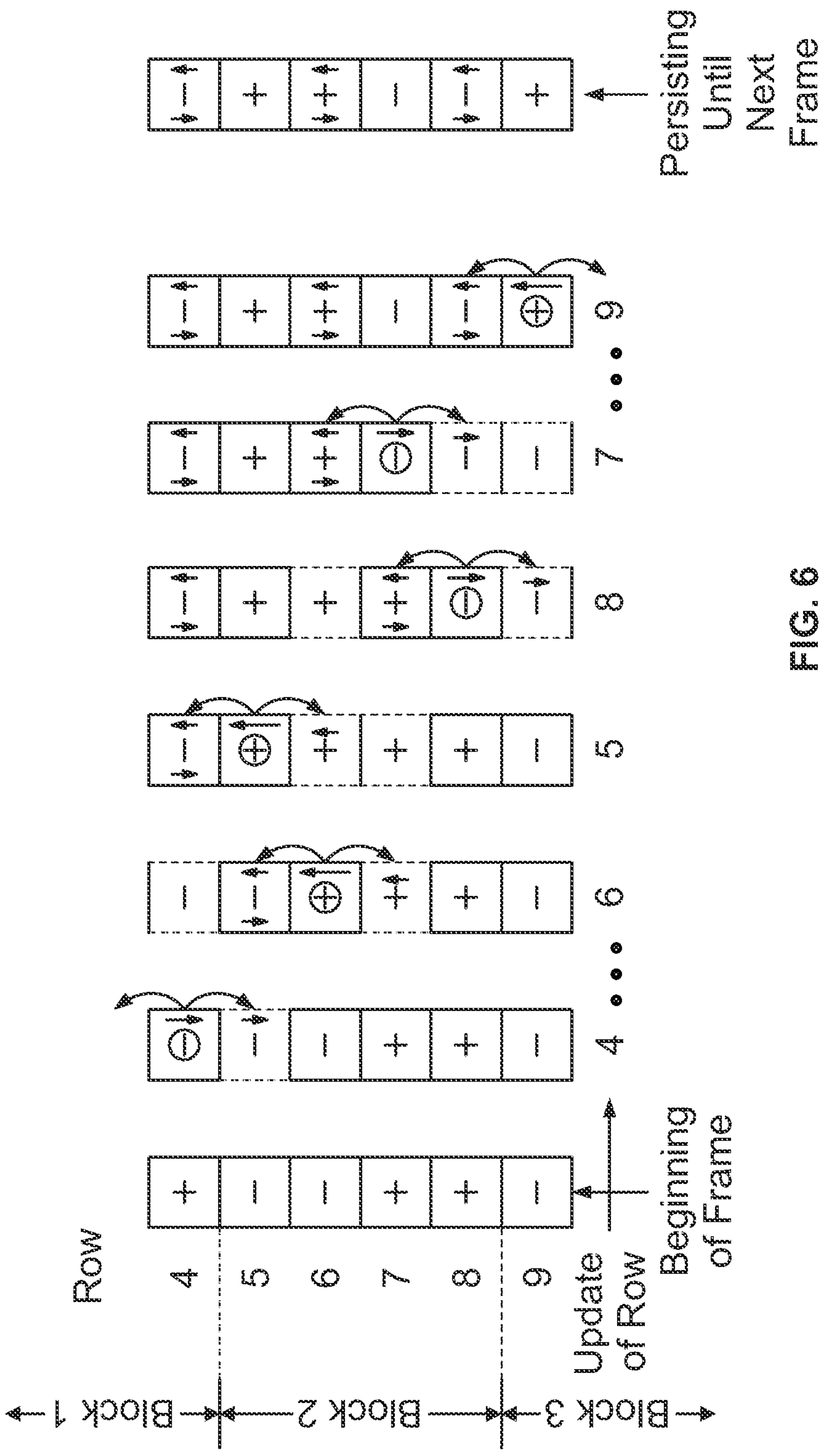
FIG. 6 illustrates an example scanning operation using an example scanning order according to various embodiments.

FIG. 6 illustrates an example scanning operation using an example scanning order according to various embodiments. In the example of FIG. 6, the display can be scanned using an example reordered scanning order of the 2-line inversion scheme. The example of FIG. 6 shows the complete scanning of block 2 (i.e., the updating of rows 5-8) and the updating of rows 4 and 9 in a frame. The example scanning operation can be performed by a scanning system as described in more detail below.

At the beginning of the frame, the voltage polarities of the sub-pixels in the first and second rows of block 2 (i.e., sub-pixels 5 and 6) can be negative, and the voltage polarities of the sub-pixels in the third and fourth rows of block 2 (i.e., sub-pixels 7 and 8) can be positive. In this example scanning order of the 2-line inversion scheme, each block can be scanned in the following order of rows: second row, first row, fourth row, third row (2nd, 1st, 4th, 3rd).

Scanning of the display in the frame can begin with the update of the second row in the block 1 (i.e., row 2, not shown) and continue with the scanning of rows 1 (not shown) and 4. FIG. 6 illustrates the update of sub-pixel 4, during which a negative voltage can be applied to the pixel electrode of sub-pixel 4, which can result in a large negative swing in voltage. The large negative swing in the voltage of the pixel electrode of sub-pixel 4 can result in an increase in the brightness of sub-pixel 5. The scanning can continue with the update of sub-pixel 3 (not shown), which can result in an increase in the brightness of sub-pixel 4.

Scanning can continue with the update of sub-pixel 6, during which a positive voltage can be applied to the pixel electrode of sub-pixel 6 to update the sub-pixel to its target voltage for the frame. Updating sub-pixel 6 can result in a large positive swing in voltage, which can cause a corresponding positive change to the negative voltage of the pixel electrode of sub-pixel 5, resulting in a decrease in the brightness of sub-pixel 5. However, the brightness of sub-pixel 5 was previously increased during the update of sub-pixel 4. Therefore, a new notation is introduced in FIG. 6 for sub-pixels in which both an increase and a decrease in brightness has occurred. In the notation, the first increase or decrease in brightness is represented by a small up arrow or down arrow, respectively, to the left of the sub-pixel's polarity sign, and the second increase or decrease in brightness is represented by a small up arrow or down arrow, respectively, to the right of the polarity sign. As illustrated during the updating of sub-pixel 6 in FIG. 6, sub-pixel 5 includes a small down arrow to the left of the "–" sign, which represents the decrease in brightness of sub-pixel 5 during the update of sub-pixel 4, and includes a small up arrow to the right of the "–" sign, which represents the increase in brightness of sub-pixel 5 during the update of sub-pixel 6.

Although the amount of the decrease in brightness of sub-pixel 5 during the update of sub-pixel 4 can be different than the amount of the increase in brightness of sub-pixel 5 during the update of sub-pixel 6, the decrease and increase can offset each other, such that the perceptible error in the brightness of sub-pixel 5 can be reduced or eliminated by the offsetting increase and decrease. Accordingly, in addition to the inclusion of pair of up/down arrows, FIG. 6 shows normal-thickness borders for sub-pixels in which both an increase and a decrease in brightness have occurred.

Scanning can continue with the updating of sub-pixel 5 with a positive target voltage, which can cause a positive voltage change affecting the adjacent sub-pixels with a positive change to the negative voltage of sub-pixel 4 and the positive voltage of sub-pixel 6. As a result, the brightness of sub-pixel 4 can be decreased, which can offset the increase in the brightness of sub-pixel 4 during the update of sub-pixel 3. The update of sub-pixel 5 can result in an increase in the brightness of sub-pixel 6. Scanning can continue with the updating of sub-pixel 8, which can result in a decrease in the brightness of sub-pixel 7 that can offset the increase in brightness during the update of sub-pixel 6, and can result in an increase in the brightness of sub-pixel 9. Scanning can continue as illustrated in FIG. 6.

FIG. 6 also shows the results of scanning of sub-pixels 4-9 that can persist until the next frame. Specifically, sub-pixels 4, 6, and 8 can have little or no perceptible error in brightness due to the offsetting increase and decrease occurring in each sub-pixel. Sub-pixels 5, 7, and 9 can have no error in brightness due to the overwriting of any erroneous changes in the brightness of these sub-pixels.

In this way, for example, a particular scanning order can be used in combination with a particular inversion scheme such that visual artifacts can be reduced or eliminated.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of displaying an image on a display described above can be performed by computer-executable instructions, such as software/firmware, residing in a medium, such as a memory, that can be executed by a processor, as one skilled in the art would understand. The software/firmware can be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any physical medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like. In the context of this document, a "non-transitory computer-readable storage medium" does not include signals. In contrast, in the context of this document, a "computer-readable medium" can include all of the media described above, and can also include signals.

Figure 7:
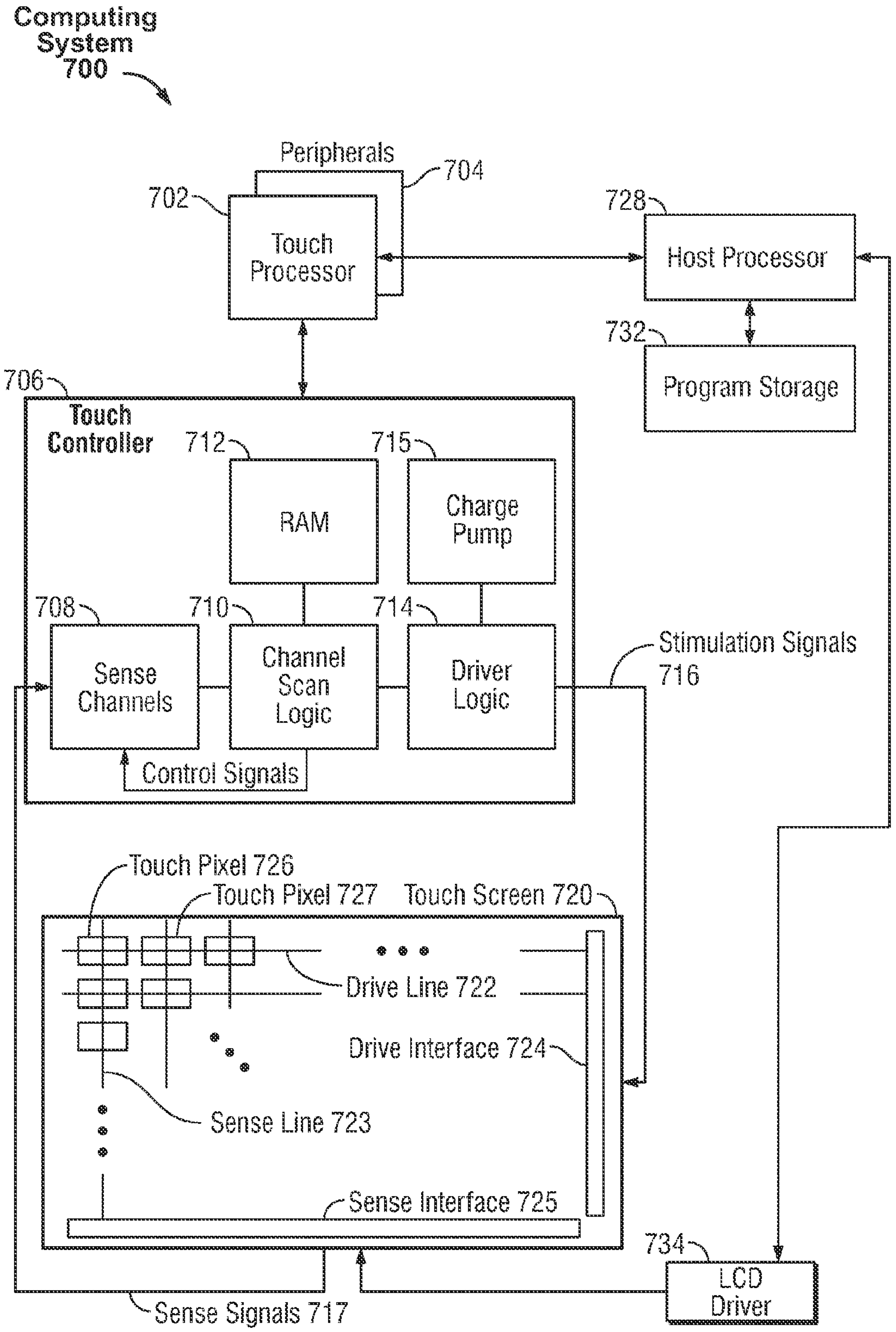
FIG. 7 is a block diagram of an example computing system that illustrates one implementation of an example scanning system of a display screen according to embodiments of the disclosure.

FIG. 7 is a block diagram of an example computing system 700 that illustrates one implementation of an example scanning system of a display screen according to embodiments of the disclosure. In the example of FIG. 7, the computing system is a touch sensing system 700 and the display screen is a touch screen 720, although it should be understood that the touch sensing system is merely one example of a computing system, and that the touch screen is merely one example of a type of display screen. Computing system 700 could be included in, for example, mobile telephone 136, digital media player 140, personal computer 144, or any mobile or non-mobile computing device that includes a touch screen. Computing system 700 can include a touch sensing system including one or more touch processors 702, peripherals 704, a touch controller 706, and touch sensing circuitry (described in more detail below). Peripherals 704 can include, but are not limited to, random access memory (RAM) or other types of memory or non-transitory computer-readable storage media capable of storing program instructions executable by the touch processor 702, watchdog timers and the like. Touch controller 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive regions of the touch sensing circuitry of touch screen 720. In some embodiments, touch controller 706, touch processor 702 and peripherals 704 can be integrated into a single application specific integrated circuit (ASIC). A processor, such as touch processor 702, executing instructions stored in non-transitory computer-readable storage media found in peripherals 704 or RAM 712, can control touch sensing and processing, for example.

Computing system 700 can also include a host processor 728 for receiving outputs from touch processor 702 and performing actions based on the outputs. For example, host processor 728 can be connected to program storage 732 and a display controller, such as an LCD driver 734. Host processor 728 can use LCD driver 734 to generate an image on touch screen 720, such as an image of a user interface (UI), by executing instructions stored in non-transitory computer-readable storage media found in program storage 732, for example, to scan lines (e.g., rows) of sub-pixels of touch screen 720 by applying voltages to pixel electrodes of adjacent sub-pixels in different lines such that polarity changes in opposite directions can occur in two sub-pixels that are adjacent to a particular sub-pixel. In other words, host processor 728 and LCD driver 734 can operate as a scanning system in accordance with the foregoing example embodiments. In some embodiments the touch processor 702, touch controller 706, or host processor 728 may independently or cooperatively operate as a scanning system in accordance with the foregoing example embodiments. Host processor 728 can use touch processor 702 and touch controller 706 to detect and process a touch on or near touch screen 720, such a touch input to the displayed UI. The touch input can be used by computer programs stored in program storage 732 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to touch processing.

Touch screen 720 can include touch sensing circuitry that can include a capacitive sensing medium having a plurality of drive lines 722 and a plurality of sense lines 723. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 722 can be driven by stimulation signals 716 from driver logic 714 through a drive interface 724, and resulting sense signals 717 generated in sense lines 723 can be transmitted through a sense interface 725 to sense channels 708 (also referred to as an event detection and demodulation circuit) in touch controller 706. In this way, drive lines and sense lines can be part of the touch sensing circuitry that can interact to form capacitive sensing nodes, which can be thought of as touch picture elements (touch pixels), such as touch pixels 726 and 727. This way of understanding can be particularly useful when touch screen 720 is viewed as capturing an "image" of touch. In other words, after touch controller 706 has determined whether a touch has been detected at each touch pixel in the touch screen, the pattern of touch pixels in the touch screen at which a touch occurred can be thought of as an "image" of touch (e.g. a pattern of fingers touching the touch screen).

In some example embodiments, touch screen 720 can be an integrated touch screen in which touch sensing circuit elements of the touch sensing system can be integrated into the display pixels stackups of a display.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. One skilled in the art would understand that other types of display screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. A method of updating an image displayed by a display screen in a first image frame, the display screen including a plurality of sub-pixels, the method comprising:

updating one or more target sub-pixels by applying a target voltage to the one or more target sub-pixels;

updating, after the update of the one or more target sub-pixels, one or more first sub-pixels by applying a first voltage to the one or more first sub-pixels, the one or more first sub-pixels being adjacent to the one or more target sub-pixels, wherein the application of the first voltage changes a voltage polarity of the one or more first sub-pixels in one of a positive direction and a negative direction and the application of the first voltage causes a first brightness change to the one or more target sub-pixels; and updating, after the update of the one or more first sub-pixels, one or more second sub-pixels by applying a second voltage to the one or more second sub-pixels, the one or more second sub-pixels being adjacent to the one or more target sub-pixels, wherein the application of the second voltage changes a voltage polarity of the one or more second sub-pixels in an opposite direction as the change in voltage polarity of the one or more first sub-pixels and the application of the second voltage causes a second brightness change to the one or more target sub-pixels, the second brightness change offsetting the first brightness change.

2. The method of claim 1, wherein the application of the target voltage changes a voltage polarity of the one or more target sub-pixels.

3. The method of claim 1, wherein the plurality of sub-pixels are updated according to an inversion scheme, and the one or more target sub-pixels, one or more first sub-pixels, and one or more second sub-pixels are included in a block of sub-pixels of the inversion scheme.

4. The method of claim 3, wherein the inversion scheme is one of a 2-line inversion scheme and a 2-dot inversion scheme.

5. The method of claim 4, wherein the block further includes one or more third sub-pixels adjacent to the one or more second sub-pixels, the sub-pixels being arranged in rows such that the one or more first sub-pixels are a first row of the block, the one or more target sub-pixels are a second row of the block, the one or more second sub-pixels are a third row of the block, and the one or more third sub-pixels are a fourth row of the block, and wherein a scanning order of the block is second row, first row, fourth row, and third row.

6. The method of claim 3, wherein the block further includes one or more third sub-pixels adjacent to the one or more second sub-pixels, the method further comprising:

updating, before the update of the one or more second subpixels, the one or more third sub-pixels by applying a third voltage to the one or more third sub-pixels.

7. The method of claim 6, wherein the application of the third voltage changes the voltage polarity of the one or more third sub-pixels.

8. An apparatus comprising:

a display screen including a plurality of sub-pixels including one or more target sub-pixels, one or more first sub-pixels, and one or more second sub-pixels, the one or more target sub-pixels being in between and adjacent to each of the one or more first sub-pixels and the one or more second sub-pixels; and a scanning system that scans the plurality of sub-pixels to update the sub-pixels, including updating the one or more target sub-pixels by applying a target voltage to the one or more target sub-pixels, updating, after the update of the one or more target sub-pixels, one or more first sub-pixels by applying a first voltage to the one or more first sub-pixels, wherein the application of the first voltage changes a voltage polarity of the one or more first sub-pixels in one of a positive direction and a negative direction and the application of the first voltage causes a first brightness change to the one or more target sub-pixels, and updating, after the update of the one or more first sub-pixels, one or more second sub-pixels by applying a second voltage to the one or more second sub-pixels, wherein the application of the second voltage changes a voltage polarity of the one or more second sub-pixels in an opposite direction as the change in voltage polarity of the one or more first sub-pixels and the application of the second voltage causes a second brightness change to the one or more target sub-pixels, the second brightness change offsetting the first brightness change.

9. The apparatus of claim 8, wherein the application of the target voltage changes a voltage polarity of the one or more target sub-pixels.

10. The apparatus of claim 8, wherein scanning system scans the plurality of sub-pixels according to an inversion scheme, and the one or more target sub-pixels, one or more first sub-pixels, and one or more second sub-pixels are included in a block of adjacent sub-pixels of the inversion scheme.

11. The apparatus of claim 10, wherein the inversion scheme is one of a 2-line inversion scheme and a 2-dot inversion scheme.

12. The apparatus of claim 11, wherein the block further includes one or more third sub-pixels adjacent to the one or more second sub-pixels, the one or more third sub-pixels arranged in rows such that the one or more first sub-pixels are a first row of the block, the one or more target sub-pixels are a second row of the block, the one or more second sub-pixels are a third row of the block, and the one or more third sub-pixels are a fourth row of the block, and wherein the scanning system scans the block in a scanning order of the block, the scanning order being second row, first row, fourth row, and third row.

13. The apparatus of claim 10, wherein the block further includes one or more third sub-pixels adjacent to the one or more second sub-pixels, and the scanning of the plurality of lines of sub-pixels by the scanning system further includes updating, before the update of the one or more second sub-pixels, the one or more third sub-pixels by applying a third voltage to one or more third sub-pixels.

14. The apparatus of claim 13, wherein the application of the third voltage changes a voltage polarity of the one or more third sub-pixels.

15. A non-transitory computer-readable storage medium storing computer-readable instructions that, when executed by a computing device, cause the device to perform a method of updating an image displayed by a display screen in a first image frame, the display screen including a plurality of sub-pixels, the method comprising:

updating one or more target sub-pixels by applying a target voltage to the one or more target sub-pixels;

updating, after the update of the one or more target sub-pixels, one or more first sub-pixels by applying a first voltage to the one or more first sub-pixels, the one or more first sub-pixels being adjacent to the one or more target sub-pixels, wherein the application of the first voltage changes of a voltage polarity of the one or more first sub-pixels in one of a positive direction and a negative direction and the application of the first voltage causes a first brightness change to the one or more target sub-pixels; and updating, after the update of the one or more first sub-pixels, one or more second sub-pixels by applying a second voltage to one or more second sub-pixels, the one or more second sub-pixels being adjacent to the one or more target sub-pixels, wherein the application of the second voltage changes a voltage polarity of the one or more second sub-pixels in an opposite direction as the change in voltage polarity of the one or more first sub-pixels and the application of the second voltage causes a second brightness change to the one or more target sub-pixels, the second brightness change equal to or less than the first brightness change.

16. The non-transitory computer-readable storage medium of claim 15, wherein the application of the target voltage changes the voltage polarity of the one or more target sub-pixels.

17. The non-transitory computer-readable storage medium of claim 15, wherein the plurality of sub-pixels are updated according to an inversion scheme, and the one or more target subpixels, the one or more first sub-pixels, and the one or more second sub-pixels are included in a block of adjacent sub-pixels of the inversion scheme.

18. The non-transitory computer-readable storage medium of claim 17, wherein the inversion scheme is one of a 2-line inversion scheme and a 2-dot inversion scheme.

19. The non-transitory computer-readable storage medium of claim 18, wherein the block further includes one or more third sub-pixels adjacent to the one or more second sub-pixels, the one or more third sub-pixels arranged in rows such that the one or more first sub-pixels are a first row of the block, the one or more target sub-pixels are a second row of the block, the one or more second sub-pixels are a third row of the block, and the one or more third sub-pixels are the fourth row of the block, and wherein a scanning order of the block is second row, first row, fourth row, and third row.

20. The non-transitory computer-readable storage medium of claim 17, wherein the block further includes one or more third sub-pixels adjacent one or more second sub-pixels, the method further comprising:

updating, before the update of the one or more second sub-pixels, the one or more third sub-pixels by applying a third voltage to the one or more third sub-pixels.

21. The non-transitory computer-readable storage medium of claim 20, wherein the application of the third voltage changes a voltage polarity of the one or more third sub-pixels.

* * * * *